United States Patent
Brumm et al.

(10) Patent No.: US 7,221,683 B2
(45) Date of Patent: May 22, 2007

(54) TELECOMMUNICATIONS SYSTEM HAVING A PACKET-SWITCHING COMMUNICATIONS NETWORK AND METHOD FOR OPERATING SUCH A TELECOMMUNICATIONS SYSTEM

(75) Inventors: Thomas Brumm, Gauting-Koenigswiesen (DE); Udo Klotz, Neuried (DE); Norbert Loebig, Darmstadt (DE); Walter Zinkl, Wien (DE); Patrick Kleiner, Munich (DE); Robert Kresnik, Slovenska Bistrica (SI); Irena Romanski, Egling (DE)

(73) Assignee: Siemens Aktiengesellschaft, Munich (DE)

( * ) Notice: Subject to any disclaimer, the term of this patent is extended or adjusted under 35 U.S.C. 154(b) by 762 days.

(21) Appl. No.: 09/827,433

(22) Filed: Apr. 6, 2001

(65) Prior Publication Data

US 2002/0054590 A1 May 9, 2002

(30) Foreign Application Priority Data

Apr. 6, 2000 (DE) ................. 100 17 224

(51) Int. Cl.
*H04L 12/66* (2006.01)
*H04L 12/26* (2006.01)
(52) U.S. Cl. ............... 370/467; 370/353; 370/401
(58) Field of Classification Search ........ 370/351–356, 370/389, 392, 395.1, 398, 395.2, 395.5, 395.52, 370/395.6, 400, 401, 465–467, 395
See application file for complete search history.

(56) References Cited

U.S. PATENT DOCUMENTS

| | | | |
|---|---|---|---|
| 6,314,284 B1* | 11/2001 | Patel et al. ............... 455/417 |
| 6,330,244 B1* | 12/2001 | Swartz et al. ............. 370/401 |
| 6,466,662 B1* | 10/2002 | Klaghofer et al. ..... 379/212.01 |
| 6,680,952 B1* | 1/2004 | Berg et al. ............... 370/467 |
| 6,687,747 B1* | 2/2004 | Huang et al. ............. 709/223 |
| 6,707,797 B1* | 3/2004 | Gardell et al. ........... 370/260 |
| 6,738,390 B1* | 5/2004 | Xu et al. .................. 370/467 |
| 6,804,224 B1* | 10/2004 | Schuster et al. .......... 370/352 |
| 6,856,676 B1* | 2/2005 | Pirot et al. ........... 379/201.01 |
| 6,885,658 B1* | 4/2005 | Ress et al. ................ 370/352 |
| 7,051,099 B2* | 5/2006 | Ziegler et al. ............ 709/224 |
| 7,099,303 B2* | 8/2006 | Astleitner et al. ......... 370/352 |
| 2002/0044545 A1* | 4/2002 | Brumm et al. ............ 370/352 |
| 2002/0075851 A1* | 6/2002 | Brumm et al. ............ 370/352 |
| 2003/0095541 A1* | 5/2003 | Chang et al. ............. 370/352 |
| 2005/0232193 A1* | 10/2005 | Jorgensen .................. 370/329 |

FOREIGN PATENT DOCUMENTS

EP 0 966 145 12/1999

OTHER PUBLICATIONS

XP-000949839 "Comparison H.323 and SIP Telephony Signaling", Dalgie et al., pp. 106-122.
XP-000835313—Supplementary Services in the H.323 Telephony Network, Korpi, pp. 118-125.
ITU-Recommendation H.450.1—Generic functional protocol for the support of supplementary services in H.323, pp. 1-21.
ITU-T Recommendation H.323—Packet-Based Multimedia Communications Systems, pp. 1-129.

* cited by examiner

*Primary Examiner*—Chau Nguyen
*Assistant Examiner*—Ahmed Elallam
(74) *Attorney, Agent, or Firm*—Bell, Boyd & Lloyd LLP

(57) ABSTRACT

A telecommunications system having a packet-switching communications network, and to a method for operating such a telecommunications system, wherein at least a first subscriber is connected to a packet-switching communications network, a network element of a circuit-switching communications network is connected to the packet-switching communications network using an interface unit, and a first signaling information is transmitted between the network element and the subscriber, the first signaling information corresponding to a signaling standard of a circuit-switching communications network.

18 Claims, 3 Drawing Sheets

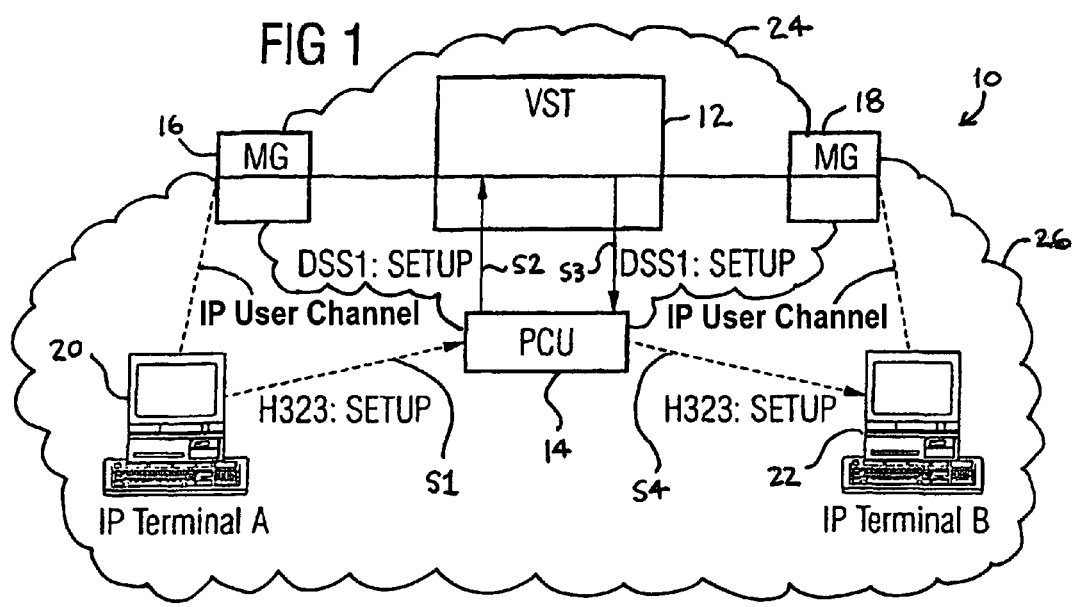
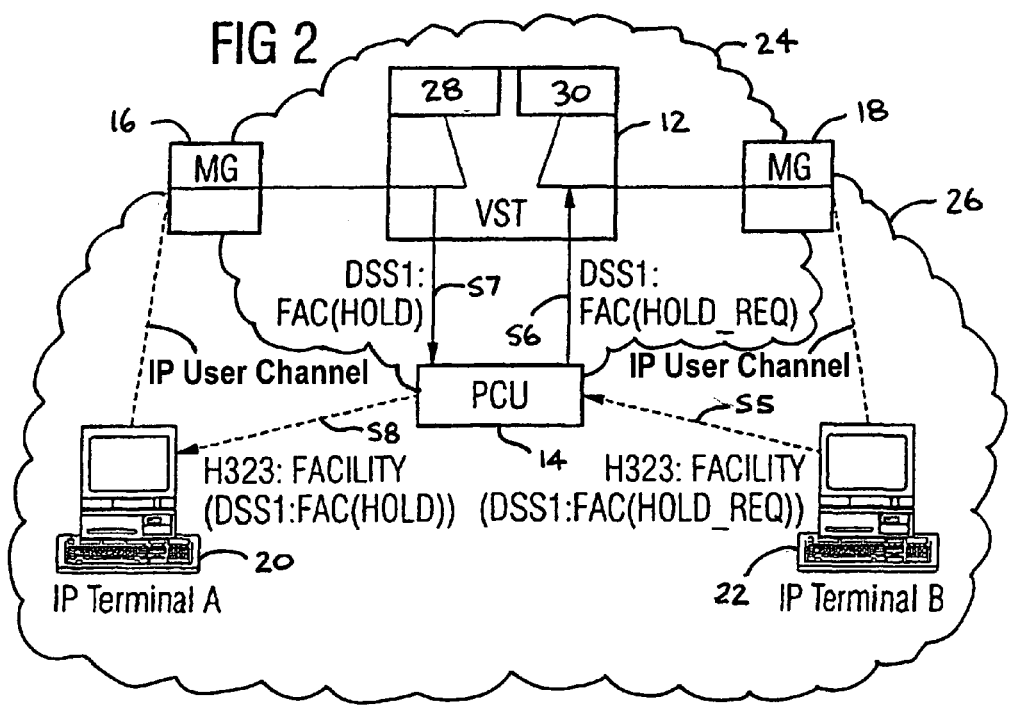

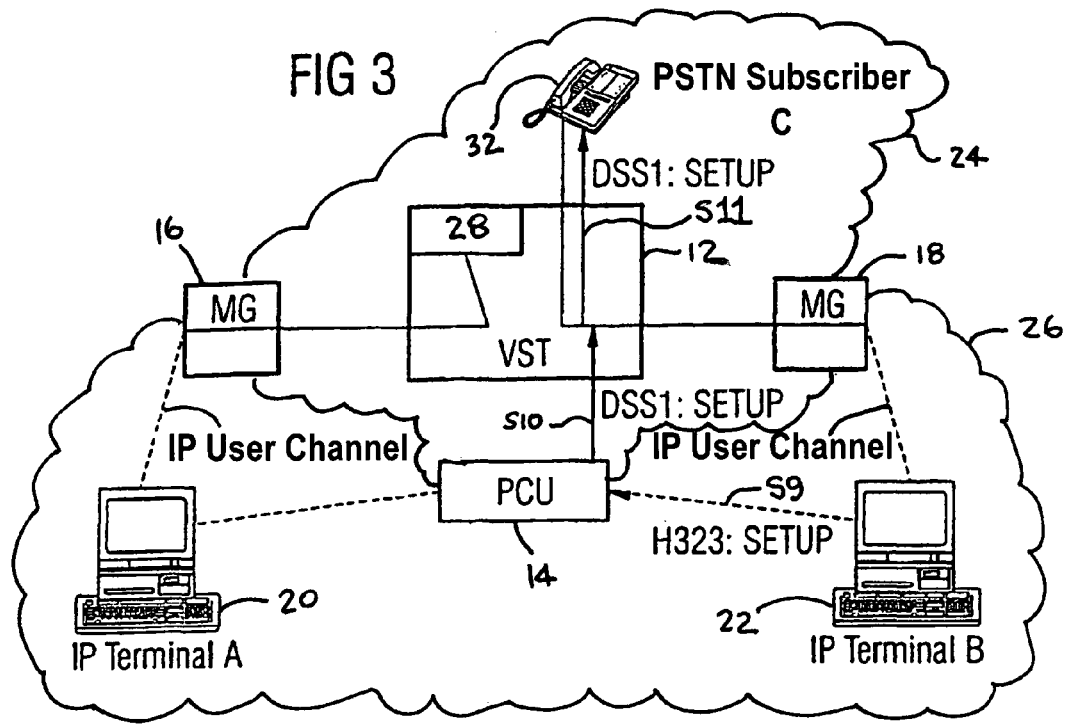
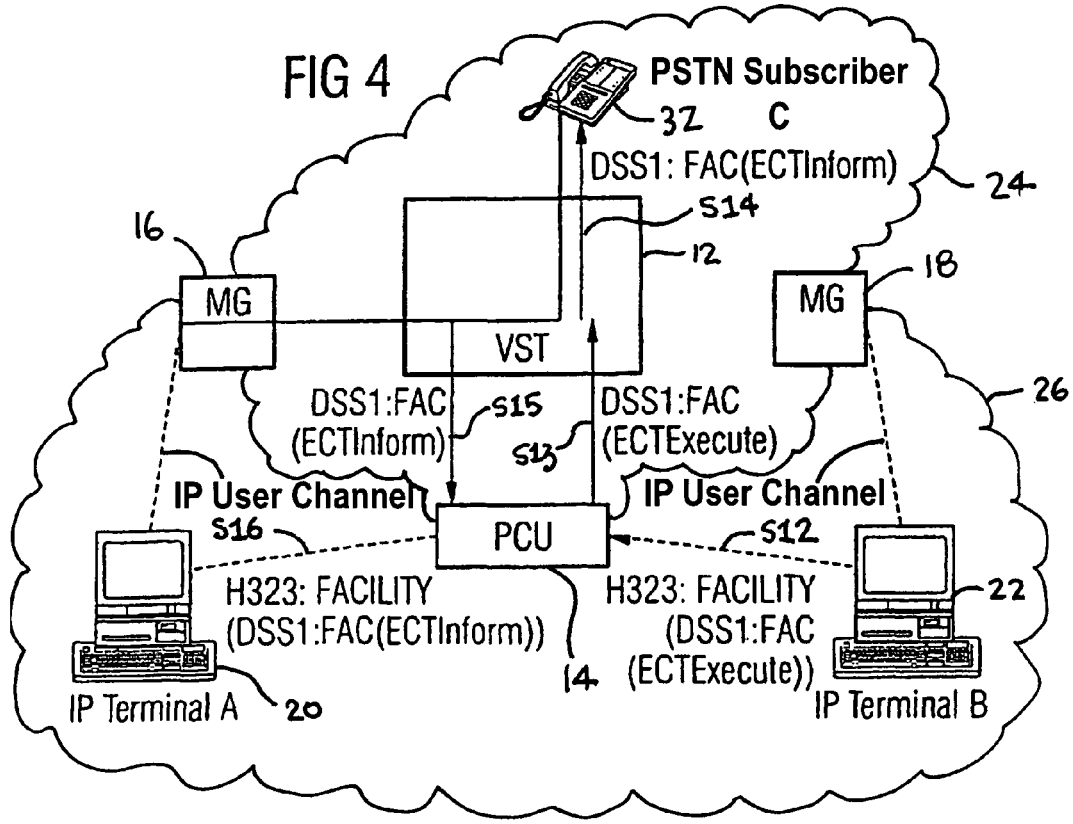

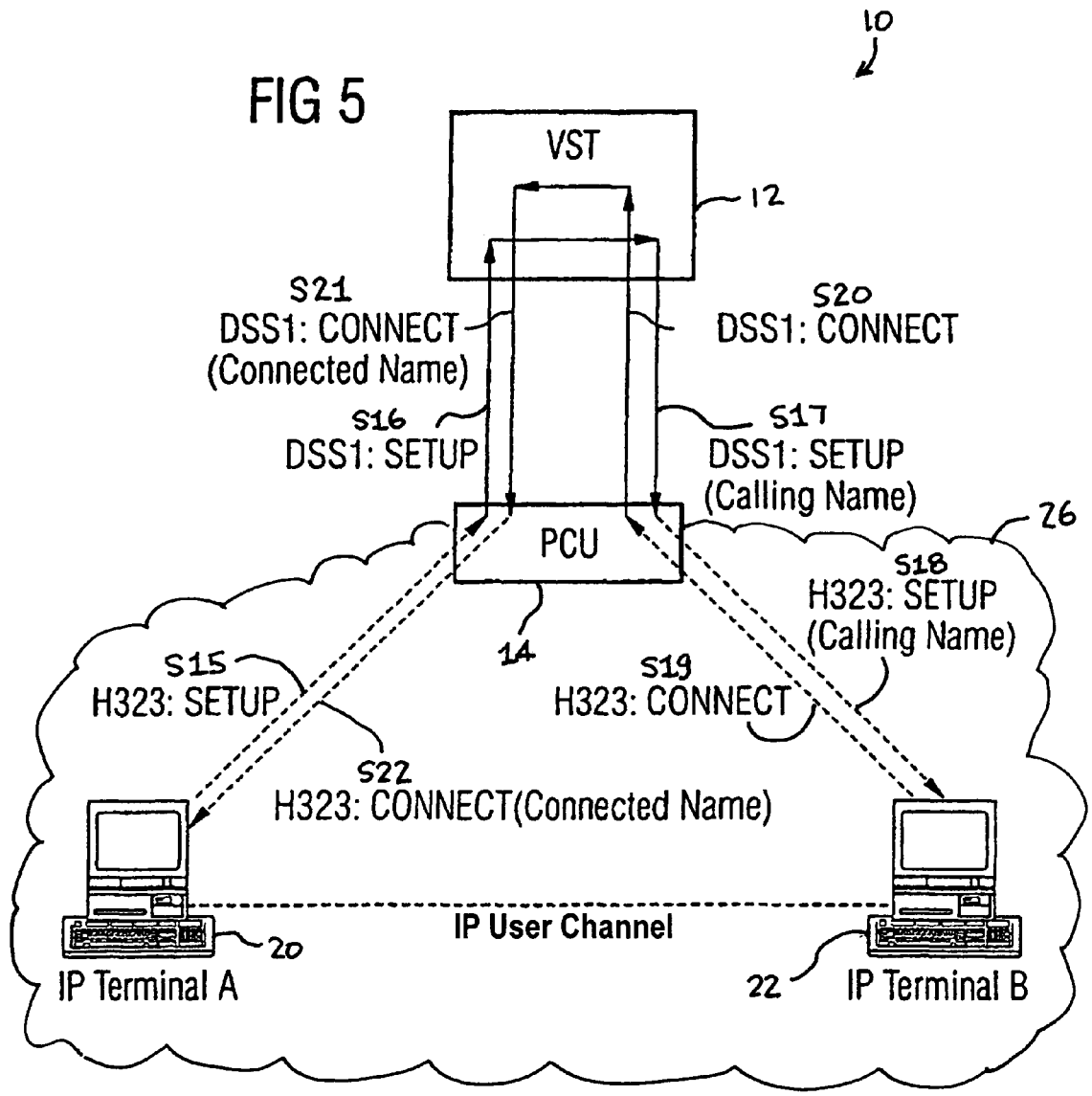

TELECOMMUNICATIONS SYSTEM HAVING A PACKET-SWITCHING COMMUNICATIONS NETWORK AND METHOD FOR OPERATING SUCH A TELECOMMUNICATIONS SYSTEM

BACKGROUND OF THE INVENTION

The present invention relates to a telecommunications system having a packet-switching communications network in which at least a first subscriber is connected to a packet-switching communications network. The present invention also relates to a method for operating such a telecommunications system.

There are various types of communications networks for transmitting voice, video data and further data. Different services and features have been developed for each of these communications networks by virtue of the various ways in which these communications networks can be used. Conventional communications networks for the transmission of voice are generally circuit-switching communications networks and communications networks for transmitting other data are usually packet-switching communications networks; for example, a local computer network (Local Area Network; LAN) or the Internet. Presently, however, at present voice, data and video services of both types of communications networks can be made available. It is therefore possible, for example, to connect a subscriber to the circuit-switching communications network via a packet-switching communications network. Supplementary services such as call pick-up, three-way conferencing, large-scale conferencing, holding, displaying of toll information, closed user group, call number identification, automatic callback when busy, automatic callback when no reply, call barring, call waiting and call forwarding which are made available in known circuit-switching communications networks also can, to a certain extent, be used in packet-switching communications networks. Standards, for example in the series of Recommendations of the International Telecommunication Union Telecommunications Standardization Sector (ITU-T Recommendation) based on H.323, are defined for packet-switching communications networks. These standards include, in particular, the Standards H.323, H.225 and H.450.

An H.323 architecture for supplementary services in which there is a possibility of interaction of the services between circuit-switching and packet-switching communications networks is also known. For example, it is known that user-channel-related signaling messages for activating, deactivating, requesting and controlling services and features in the circuit-switching communications network are mapped onto signaling packets which are used in the packet-switching communications network. Preferably, "DSS1 messages", which are defined in the ITU Standards Q.931 and Q.932, are used in the circuit-switching communications network. Preferably the standardized H.225 signaling protocol is used for transmitting the signaling packets in the packet-switching communications network; in particular, over the Internet. Service features and features which to be used require user-channel-related signaling messages are, for example, call pick-up, three-way conferencing and large-scale conferencing, holding, displaying of toll information, closed user group and call number identification services. Signaling which is independent of a user connection or a user channel is necessary for status interrogations and for activating or deactivating service features; for example, call divert, automatic callback when busy, automatic callback when no reply and call waiting.

Components such as terminals, gateways and gatekeepers are provided and defined for transmitting voice according to the H.323 Standard. Terminals are terminating devices which are connected to the packet-switching communications network. In packet-switching communications networks it is necessary for the subscriber to log on with his/her terminal. A gateway is used as an interface for converting the data protocols between the packet-switching communications network and the circuit-switching communications network. A gatekeeper is used to administer and to check user services and network capacities of a packet-switching communications network according to the H.323 Standard. The addressing of an incoming call also takes place in the gatekeeper in the packet-switching communications network. Each subscriber has an address in the packet-switching communications network. The telephone number which is selected by a calling subscriber is converted by the gatekeeper to the address of the called subscriber in the packet-switching communications network. In this way, the H.323 Standard can be used to transmit telephone calls over the Internet and in networks based on an Internet protocol.

Large packet-switching networks provide the possibility of enabling a number of employees who do not work in the same office, or do not work in the same office continuously, to use common functions via the network. This is sensible, in particular, if employees have to travel often or work as teleworkers at home. These employees are then connected to an external data network; for example, the Internet. This Internet provides these employees with access to an internal data network of the company, for example an Intranet, and to a telecommunications network of the company, e.g. the voice network. Employees who work, for example, for a department or on a project are combined into groups, which are known as CENTREX groups, in particular for the sake of better accessibility. CENTREX is a special service which is made available using a network node of a telecommunications network. CENTREX can be used to provide some of the connected subscribers, for example the employees of the department or of the project, with a range of functions corresponding approximately to the range of functions of a private branch exchange, even though they are not all connected to the same private branch exchange. Using the CENTREX service it is possible, for example, for an incoming call for one employee in the group also to be made visible and available to other preset subscribers. Thus, with the CENTREX service there is also the possibility of presetting a team call or a call transfer. Here, when there is an incoming call to a subscriber line in the group a message is generated which is transmitted to the other subscriber lines which are preset in this group. Each subscriber of the group can then receive this call. Each of the subscribers in the group can also receive calls parked in the system. The subscribers of the CENTREX group can also have a common call number schedule which can be used by all the subscriber lines. However, with the prior art, it is possible to use the CENTREX service and other services known on voice connections, such as three-way conferencing, call forwarding, call playback, subscriber cut-in, recorded announcement services and private call number schedule only in a circuit-switching communications network.

According to the H.323/H.450 Standards, these services are not supported for voice connections using the packet-switching communications network, or at least not to the same extent.

An object of the present invention is, therefore, to disclose a telecommunications system having a packet-switching communications network, and a method for operating such a telecommunications system, which provides a subscriber of the packet-switching communications network with services and features of a circuit-switching communications network.

SUMMARY OF THE INVENTION

By using a telecommunications system of the present invention it is possible to transmit the signaling information of the network element of the circuit-switching communications network to the first subscriber of the packet-switching communications network. This ensures that this subscriber can be provided cost-effectively with services and features, for example services and features of the telecommunications network which are known from ISDN. The network element is, for example, a conventional switching office which is connected to the interface unit. The network element administers the subscriber and carries out the subscriber signaling for setting up connections and for making available services and features for the first subscriber. This takes place in the same way as for conventional subscribers which are connected to a conventional network element.

The signaling information which is transferred from the interface unit to the packet-switching communications network is transmitted between the interface unit and the first subscriber using the packet-switching communications network. In this way, the signaling information of the network element is fed directly to the first subscriber. Signaling information can, thus, be exchanged between the network element and the first subscriber without being restricted by the signaling possibilities of the packet-switching communications network in the subscriber signaling of the first subscriber. In this way, it is also possible to provide the first subscriber with services and features which are not available to other subscribers whose subscriber signaling is carried out only with the signaling possibilities of the packet-switching communications network. All conventional services and features of a telecommunications network, for example all ISDN services and features, can thus be made available to the first subscriber. As a result, the first subscriber does not need to give up communications functions and communications quality which are available to subscribers of conventional telecommunications networks.

In one embodiment of the present invention, the first signaling information corresponds to a DSS1 signaling protocol. Via the DSS1 signaling protocol, it is also possible to use a widespread and reliable signaling protocol for subscriber signaling of the first subscriber in the packet-switching communications network.

In another embodiment of the present invention, a portion of the first signaling information is converted into second signaling information using the interface unit and is transmitted as second signaling information between the interface unit and the first subscriber. This ensures that the signaling information of the network element which can be converted into signaling information of the packet-switching communications network, i.e. for which there is corresponding equivalent signaling information in the packet-switching communications network, is also transmitted using the signaling system of the packet-switching communications network, or that this signaling information is used to carry out the subscriber signaling via the packet network.

It is advantageous here if the second signaling functions correspond to an H.323/H.450 signaling protocol. This ensures that a proven signaling protocol of the packet-switching communications network is used for voice and telecommunications connections. As a result, it is also possible to provide the first subscriber with services and features, for example for setting up a voice connection to a second subscriber of the packet-switching communications network, via the signaling system of the packet-switching communications network.

In another embodiment, the second signaling information corresponds to a SIP signaling protocol. The SIP signaling protocol is, like the H.323/H.450 signaling protocol, a signaling protocol which is widespread in packet networks and is used for subscriber signaling and for making available services and features for subscribers of packet-switching communications networks. In this way, subscriber signaling of the first subscriber also can be carried out using the network element if this subscriber is connected in a packet-switching communications network with a SIP signaling protocol.

In one advantageous embodiment of the present invention, the second signaling information is transmitted using signaling packets of the packet-switching communications network. The first signaling information is transmitted using a data area of these signaling packets which does not contain any second signaling information. This ensures that the first signaling information is transmitted using existing transmission ways of the packet-switching communications network without requiring additional transmission capacity in the packet-switching communications network. Furthermore, just one type of signaling packet has to be evaluated and processed in order to process the signaling information.

According to another embodiment, at least one service feature and/or feature which cannot be used by the second signaling information is made available via the first signaling information. The services and/or features include, for example, call pick-up, call divert, call forwarding, call name display, subscriber cut-in, subscriber-dependent ringing, three-way conferencing, large-scale conferencing, holding, displaying of toll information, a closed user group, a private call number schedule, call number identification, automatic callback when busy, automatic callback when no reply, call barring, call waiting and/or call transfer. This ensures that the subscriber is provided with at least one service and/or feature which he/she cannot use via the conventional subscriber signaling of the packet-switching communications network. The first signaling information can be used to provide the first subscriber with all the services and features which the network element supports. As a result of the possibility of using such known services and features, the first subscriber has a high level of communications convenience and a high level of communications quality.

In another embodiment of the present invention, the first signaling information is transmitted between the first subscriber and a second subscriber using the packet-switching communications network and in accordance with the tunnel principle in which the first signaling information is also exchanged directly between two subscribers of the packet-switching communications network. As a result, these subscribers of the packet-switching communications network are provided with additional services and features for a connection or for signaling between the two subscribers. In this way, the subscriber signaling does not need to be carried out exclusively via the network element.

When there is a connection between the first subscriber and a second subscriber, the user data is transmitted using the network element; i.e., the user data are routed via the network element. This ensures that the network element can make available functions for services and features which also relate to the user data. Furthermore, this ensures that the network element can monitor the quality of the connection between the first and second subscribers. It is thus possible to transmit, for example, tones or announcements to the subscribers. This is appropriate, for example, in the case of conference circuits between a number of subscribers because information announcements and waiting announcements can then be transmitted to the subscribers before the conference circuit is switched. Via the monitoring of the quality of the user data transmission by the network element it is also possible to interrupt the connection between the subscribers when minimum requirements are not met; for example, as a result of overloading of the packet network or of the subscriber line. By routing the user connection via the network element, the first subscriber can also set up a connection to subscribers of a circuit-switching communications network which is connected to the network element.

In another advantageous development, the user data between the first subscriber and a second subscriber of the packet-switching communications network is transmitted directly between the subscribers using the packet-switching communications network. As a result, the data which is to be transmitted between the network element and the subscribers is restricted to the data for transmitting the signaling information. The network element can, thus, be used to set up or control significantly more connections between subscribers because the number of connections which can be set up simultaneously is no longer dependent on the user data volume or on the available connecting lines of the network element. If the network element serves exclusively for the subscriber signaling of subscribers of a packet-switching communications network, it is possible to dispense with units for converting the user data of the packet-switching communications network into user data of the circuit-switching communications network, the units being what is referred to as media gateways.

In the network element, the first subscriber can assume the functions of a main line or of an extension. In this way, the subscriber can be administered by the network element, as can conventional subscribers of circuit-switching communications networks. It is, thus, possible to assign customary services and features to this subscriber; for example, in the database of the network element. The subscriber can be administered as a subscriber with an ISDN basic access or with a broadband ISDN access in the network element. The ISDN access also can be an ISDN access in point-to-point configuration or an ISDN access in point-to-multipoint configuration. This ensures that even for subscriber signaling of subscribers of packet-switching communications networks it is possible to assign different configuration variants to the subscriber line in a database of the network element.

It is also advantageous if the packet-switching communications network is a data network which is based on an Internet protocol and if the subscriber is an IP terminal. The widespread prevalence of networks which are based on an Internet protocol, for example the Internet or Local Area Networks (LAN), makes it possible to use the network element to carry out the subscriber signaling for a large number of subscribers, even those arranged at a large distance from one another. Such a telecommunications system also can be used to provide a subscriber simultaneously with data and voice services in the entire packet-switching communications network. The subscriber of the communications network which is based on the Internet protocol is an IP terminal which also processes the first signaling information.

A method in accordance with the teachings of the present invention ensures that the network element of a circuit-switching communications network is used to provide the first subscriber of the packet-switching communications network with services and/or features which are customary in a circuit-switching communications network but are not supported by conventional packet-switching communications networks.

Additional features and advantages of the present invention are described in, and will be apparent from, the following Detailed Description of the Invention and the Figures.

BRIEF DESCRIPTION OF THE FIGURES

FIG. 1 is a block circuit diagram showing the signaling of a connection setup between a first subscriber and a second subscriber using a switching office.

FIG. 2 shows a signaling for carrying out a "holding" feature via the subscriber B when there is an active connection between the subscriber A and the subscriber B, in the form of a block circuit diagram.

FIG. 3 shows the signaling of a call setup of the subscriber B to a further subscriber C, in the form of a block circuit diagram.

FIG. 4 is a block circuit diagram showing the signaling of the "call forwarding feature", the call to subscriber C being forwarded to subscriber A by subscriber B.

FIG. 5 shows the exchange of signaling information for the "name display" feature using a block circuit diagram.

DETAILED DESCRIPTION OF THE INVENTION

FIG. 1 illustrates a telecommunications system 10 having a switching office 12, a packet control unit 14, a media gateway 16, a media gateway 18, a first subscriber 20 and a second subscriber 22. The media gateways 16, 18 serve as interfaces for user data between a circuit-switching communications network 24 and a packet-switching communications network 26. The packet-switching communications network is a data network which is based on an Internet protocol, for example the Internet, and is designated as an IP network. The H.323/H.450 signaling standard is used for subscriber signaling in the IP network 26. The switching office 12 uses the DDS1 signaling protocol for subscriber signaling.

The packet control unit 14 serves as an interface for signaling information between the circuit-switching communications network 24 and the IP network 26. The packet control unit 14 converts the signaling information of the circuit-switching communications network 24 into signaling information of the IP network 26, and vice versa. The first subscriber 20 with the IP terminal A sets up a call to the subscriber 22 with the IP terminal B. To do this, the first subscriber 20 generates a first H.323 setup message S1 which is fed to the packet control unit 14 using the signaling system of the IP network 26. The packet control unit 14 converts the first H.323 setup message S1 into a first DSS1 setup message S2 and routes the latter to a message router system (not illustrated) of the switching office 12. The switching office 12 serves as a network element of the circuit-switching communications network 24.

The switching office 12 processes the first DSS1 setup message S2 and generates a second DSS1 setup message S3 which it transfers to the packet control unit 14 for forwarding to the second subscriber 22. The packet control unit 14 converts the second DSS1 setup message 3 into a second H.323 setup message S4, which is transmitted to the subscriber 22 with the IP terminal B using the IP network 26. The second subscriber 22 is informed of the connection request of the first subscriber 20 using this second H.323 setup message S4.

If the second subscriber 22 accepts the call, the switching office 12 switches a user data connection between the first subscriber 20 and the second subscriber 22. The user data transmission is carried out between the IP network 26 and the switching office 12 using the media gateway 16 and the media gateway 18. The subscribers 20 and 22 can exchange, for example, voice data using these user data connections. In this way, a connection setup is carried out between the first subscriber 20 and the second subscriber 22, using the switching office 12, in the same way as between two conventional subscribers which are connected directly to the switching office 12. The conversion of the signaling information from H.323 signaling information into DSS1 signaling information, and vice versa, and the conversion of the user data using the media gateways 16, 18 do not influence the type or quality of the connections setup in comparison with the connections setup between two conventional subscribers which are connected to the switching office.

In FIG. 2, the first subscriber 20 is also connected to the second subscriber 22 using the arrangement known from FIG. 1. Identical elements have identical reference symbols. During a user data connection between the first subscriber 20 and the second subscriber 22 which is switched using the switching office 12, the second subscriber 22 uses the "holding" feature in order to interrupt the connection to the first subscriber 20 and to "park" the connection to the first subscriber 20. The second subscriber 22 generates the signaling message, necessary for activating the "holding" feature, in accordance with the DSS1 signaling protocol. This signaling message is inserted by the subscriber 22 into a free data area of a signaling packet of the IP network 26 and transmitted to the packet control unit 14 using the signaling data packet S5. The data area within the signaling data packet is also referred to as a container. The packet control unit 14 removes the DSS1 signaling information S6 from the signaling data packet and transfers it to the switching office 12. The switching office 12 subsequently disconnects the user data connection between the first and second subscribers 20, 22. In addition, the switching office 12 generates a second DSS1 signaling message "holding" S7 in order to perform subscriber signaling of the first subscriber 20. This second DSS1 signaling message "holding" S7 serves to inform the first subscriber 20 that the second subscriber 22 has interrupted the connection. The DSS1 signaling message "holding" S7 is inserted by the packet control unit 14 into a free data area of a signaling packet of the IP network 26 and transmitted as a signaling packet S8 to the first subscriber 20. The first subscriber 20 removes the DSS1 signaling message S7 from the signaling packet S8 and processes said message S7.

The switching office 12 uses an announcer unit 28 to transmit to the first subscriber 20 the voice data of an announcement which is preset for the "holding" feature and which informs the first subscriber 20 that the connection has been interrupted by the second subscriber 22 and will be continued after a short time. The voice data of the announcement is converted by the media gateway 16 into packet data of the IP network 26 and transmitted to the first subscriber 20. The switching office 12 uses the user data connection between the switching office 12 and the second subscriber 22 to transmit a tone, for example a call connected signal, to the second subscriber 22. This tone is converted into packet data of the IP network 26 using the media gateway 18 and transmitted to the second subscriber 22.

The arrangement known from FIGS. 1 and 2 and a third subscriber 32 are illustrated in FIG. 3. The third subscriber 32 is connected as a conventional subscriber of the circuit-switching communications network 24 to the switching office 12. After the second subscriber 22 has interrupted the connection to the first subscriber 20 using the holding function, the announcement is additionally transmitted to the first subscriber 20 as a voice data. The second subscriber 22 sets up a connection to the third subscriber 32. To do this, the second subscriber 22 generates an H.323 setup signaling message S9 which is transmitted to the packet control unit 14 using the signaling system of the IP network 26.

The packet control unit 14 converts the H.323 setup signaling message S9 into a DSS1 setup signaling message S10. On the basis of this DSS1 setup signaling message S10, the switching office 12 generates a second DSS1 setup signaling message S11 which the switching office 12 transmits to the third subscriber 32. This signaling message S11 is used to display the connection request of the second subscriber 22 to the third subscriber 32. When the subscriber 32 accepts the call by, for example, an operator lifting up the receiver of the telephone of the third subscriber 32, the switching office 12 switches a user connection between the third subscriber 32 and the second subscriber 22. This user data connection is used to transmit the voice data of the third subscriber 32 to the media gateway 18 using the switching office 12. The media gateway 18 converts the user data into packet data of the IP network 26 and transmits it to the second subscriber 22. Conversely, voice data is transmitted from the second subscriber 22 to the media gateway 18 using the IP network 26, the media gateway 18 converting this data into voice data of the circuit-switching communications network 24 and transmitting it to the subscriber 32 via the switched connection of the switching office 12.

FIG. 4 illustrates the arrangement from FIG. 3, signaling information for call forwarding being illustrated. As described in FIG. 3, a user data connection is activated between the second subscriber 22 and the third subscriber 32. The second subscriber 22 generates a DSS1 signaling message S12 for call forwarding. This signaling message S12 is transmitted to the packet control unit 14 using a data area of an H.323 signaling data packet 12. This transmission is carried out in the same way as was described with respect to the holding message in FIG. 2. The packet control unit 14 extracts the call forwarding S13 DSS1 signaling message from the data area and transmits it to the switching office 12. The switching office 12 generates a second call forwarding information item DSS1 signaling message S14 and transmits it to the third subscriber 32 (S14) and to the packet control unit 14 (S15). The packet control unit 14 routes this second signaling message into a free data area of an H.323/signaling packet S15.

The H.323 signaling packet S15 is transmitted from the packet control unit 14 to the first subscriber 20 using the IP network 26. The first subscriber 20 is thus informed of the call forwarding. The switching office 12 subsequently disconnects the connection between the second subscriber 22 and the third subscriber 32 and the connection between the first subscriber 20 and the announcement unit 28 of the switching office 12 and switches through a connection between the first subscriber 20 and the third subscriber 32. The user data, for example the voice data, of the third subscriber 32 is transmitted to the media gateway 16 using the switching office 12, the media gateway 16 then converting this voice data into packet data of the IP network 26 and transmitting it to the first subscriber 20. Conversely, the voice data of the subscriber 20 is transmitted to the media gateway 16 using the IP network 26. The media gateway 16 converts this voice data into voice data of the circuit-switching communications network 24 and transmits it to the third subscriber 32 via the connection switched through the switching office 12.

In the subject matter according to FIGS. 1 to 4, a complete forwarding operation is implemented. In the prior art, it has not been known for a subscriber 20, 22 of an IP network 26 to be provided with such a feature. The arrangement shown in FIGS. 1 to 4 can even be used to carry out this call forwarding to a subscriber 32 of a circuit-switching communications network in that DSS1 signaling messages are generated by the subscribers 20, 22 for call forwarding and transmitted using the IP network 26. The connection setup is carried out using H.323 set up signaling messages S1, S4. However, in the prior art, signaling messages with the aid of which all the services and features of the circuit-switching communications network for which there are no equivalent services and features in the IP network 26 can be used are not known in packet-switching communications networks. With the present invention, the DSS1 signaling messages of the circuit-switching communications network 24, which cannot be converted into H.323/H.450 signaling information of the IP network 26, are transmitted as data in a free data area of the signaling data packets used in the IP network 26. The DSS1 signaling messages also can, however, be transmitted in separate data packets between the packet control unit 14 and the respective subscriber 20, 22.

In the exemplary embodiment shown in FIGS. 1 to 4 it is also possible, at least with the connection illustrated in FIG. 4, for the user data not necessarily to be routed via the switching office 12, but rather for the user data exchange to be carried out directly using the IP network 26. However, in order to be able to set up a connection to the third subscriber 32, at least the user data for the connection between the third subscriber 32 and the second subscriber 22, and between the third subscriber 32 and the first subscriber 20 must be routed via the switching office 12.

However, if a call is to be diverted to a further subscriber (not illustrated) of the IP network 26, it is possible to completely dispense with a user data transmission via the switching office 12 as well as with the media gateways 16, 18. However, in this case, it is then necessary for a network element of the IP network 26 to assume the function of the announcement unit 28 and of the tone unit 30. It is thus possible, for example, to install an announcement unit and a tone generating unit in the IP terminal A of the subscriber 20 and in the IP terminal B of the subscriber 22. Corresponding tones and announcements can then be generated or played using the received signaling information. Furthermore, it is also possible to dispense with an announcement and with the tones because they are not absolutely necessary for the implementation of the feature.

After the second subscriber 22 in FIG. 2 has activated the "holding" feature using signaling information S6 and the switching office 12 has generated a corresponding signaling information item S7 for the first subscriber 20 and transmitted it to the packet control unit 14, said switching office 12 also generates a confirmation message in accordance with the DSS1 signaling protocol, said confirmation message being routed to the packet control unit 14. This confirmation message can then be transmitted as a DSS1 signaling information item in a data area of a signaling data packet from the packet control unit 14 to the subscriber B. However, embodiments in which such an acknowledgement is not carried out for performance reasons is also conceivable, such an acknowledgement being generated in the IP terminal of the second subscriber 22 and the fault message being suppressed when such an acknowledgement message fails to occur. The same procedure can be adopted with signaling information which is not absolutely necessary for the service or the feature to function.

FIG. 5 illustrates a second exemplary embodiment in which the switching office 12 carries out a subscriber signaling of the first subscriber 20 and of the second subscriber 22 using the packet control unit 14. In this exemplary embodiment, the user data are transmitted directly between the first subscriber 20 and the subscriber 22 using the IP network 26. When there is a request for a connection from the first subscriber 20 to the second subscriber 22, the first subscriber 20 generates an H.323 setup signaling message S15. This H.323 setup signaling message S15 is transmitted to the packet control unit 14 using the IP network 26. The packet control unit 14 converts the H.323 setup signaling message S15 into a DSS1 setup signaling message S16 and transmits it to the switching office 12.

The first subscriber 12 and the second subscriber 22 form, together with further subscribers which are not illustrated, what is referred to as a CENTREX group. The method of operation and the significance of such a CENTREX group have already been explained in the introduction to the description. The membership of the first and second subscribers 20, 22 and their authorizations within the CENTREX group are stored in the database of the switching office 12. These authorizations can be used to restrict or prevent the use of services and features for individual subscribers 20, 22. Both for the first subscriber 20 and for the second subscriber 22 there are notes in the database of the switching office 12 indicating that they support the "name display" feature. The name of the first subscriber 20 and of the second subscriber 22 which are to be displayed are stored in the switching office 12.

The switching office 12 processes the DSS1 setup signaling message S16 of the first subscriber 20 and generates a second DSS1 setup signaling message S17 which contains not only signaling information for setting up connections but also the name of the calling first subscriber 20. This second DSS1 setup signaling message S17 is transmitted from the switching office 12 to the packet control unit 14. The packet control unit 14 converts the second DSS1 setup signaling message S17 into an H.323 setup signaling message S18. However, the H.323 signaling standard does not support transmitting the name of the calling subscriber. The DSS1 signaling message for transmitting the name is stored, together with the name, in a data area of the signaling data packet which is used to transmit the H.323 setup signaling message S18 to the second subscriber 22. The DSS1 signaling information for transmitting the name and the name are thus transmitted as pure data from the packet control unit 14 to the second subscriber 22 using the IP network 26.

Both the H.323 setup signaling message S18 and the data with the DSS1 signaling information for transmitting names and the name are processed by the IP terminal B of the second subscriber 22. The name of the calling subscriber 20 is subsequently displayed on a display unit of the IP terminal B of the second subscriber 22. The second subscriber 22 transmits an H.323 connect signaling message S19 to the packet control unit 14. The packet control unit 14 converts this H.323 connect signaling message S19 into a DSS1 connect signaling message S20 and transmits it to the switching office 12. The switching office 12 processes this DSS1 connect signaling message S20 and generates a second DSS1 connect signaling message S21 which contains the name of the second subscriber 22. This second DSS1 connect signaling message S21 is transmitted from the switching office 12 to the packet control unit 14. The packet control unit 14 converts the DSS1 connect signaling message S21 into an H.323 connect signaling message S22.

The DSS1 signaling information for transmitting the name of the second subscriber 22 is, however, as already mentioned, not supported by the H.323 standard. The packet control unit 14 stores the DSS1 signaling information for transmitting the name and the name in the signaling data packet which is used to transmit the H.323 connect signaling message S22 from the packet control unit 14 to the first subscriber 20. The IP terminal A of the first subscriber 20 processes both the H.323 connect signaling message S22 and the DSS1 signaling information for displaying the name and the name. In this way, the name of the second subscriber 22 is also displayed on a display unit of the IP terminal A of the first subscriber 20. The signaling information which is used to control and make available services and features which are not supported by the IP network 26 are generated and processed by the subscribers 20, 22 and by the switching office 12 as DSS1 signaling information. In this way, all known services and features of telecommunications networks 24 can be made available to subscribers 20, 22 of packet-switching communications networks 26.

The switching office 12 also checks for the connection setup between the first subscriber 20 and the second subscriber 22 whether there is an authorization of the calling first subscriber 20 and of the called second subscriber 22 to route user data via the switching office 12 and thus make use of resources for switching the connection in the switching office 12. Furthermore, it is checked whether the technical possibility exists, given such an authorization, for example whether the switching office 12 is connected to the IP network 26 using a media gateway 16 and a media gateway 18. In the present second exemplary embodiment, neither the first subscriber 20 nor the second subscriber 22 has a authorization permitting user data to be routed via the switching office 12. Furthermore, it is not technically possible to transmit voice data from the first subscriber 20 or from the second subscriber 22 to the switching office 12 because there are no media gateways present in the arrangement in FIG. 5. The user data, therefore, necessarily must be transmitted using the IP network 26. This is alluded to in FIG. 5 via the IP user channel between the first subscriber 20 and the second subscriber 22. The voice data are transmitted with this user channel when there is a voice connection between the first subscriber 20 and the second subscriber 22. The signaling data are, however, still necessarily routed via the switching office 12.

In other exemplary embodiments it is also conceivable for a portion of the signaling data to be exchanged directly between the first subscriber 20 and the second subscriber 22. This signaling data can be, for example, DSS1 signaling information for displaying names, the information being exchanged directly between the first and second subscribers 20, 22 using data packets as user data. In this way, signaling information for services and features which are not supported by a signaling standard of the IP network 26 are exchanged directly between the subscribers 20, 22. However, in this case the connection control is also carried out by the switching office 12 or by a switching entity of the packet-switching communications network; for example, by a gatekeeper.

Although the present invention has been described with reference to specific embodiments, those of skill in the art will recognize that changes may be made thereto without departing from the spirit and scope of the invention as set forth in the hereafter appended claims.

The invention claimed is:

1. A method for operating a telecommunications system having a packet-switching communications network, the method comprising the steps of:
   establishing a connection between at least one first subscriber to the packet-switching communications network;
   establishing a connection between a network element of a circuit-switching communications network to the packet-switching communications network using an interface unit;
   transmitting first signaling information, intended for the at least one first subscriber, from the network element to the interface unit;
   processing the first signaling information in the interface unit wherein at least one part of the first signaling information is configured according to a signaling standard of the circuit-switching communication network and the remaining part is converted to second signaling information according to the signaling standard of the packet-switched communications network; and
   transmitting the processed signaling information from the interface unit to the first subscriber, wherein the second signaling information is transmitted using signaling packets of the packet-switching communications network, and the at least one part of the first signaling information is transmitted using a data area of the signaling packets that do not contain any second signaling information.

2. The method as claimed in claim 1, wherein the first signaling information corresponds to a DSS1 signaling protocol.

3. The method as claimed in claim 1, wherein the second signaling information corresponds to an H.323/H.450 signaling protocol.

4. The method as claimed in claim 1, wherein the second signaling information corresponds to a SIP signaling protocol.

5. The method as claimed in claim 1, wherein the second signaling information is transmitted using signaling packets of the packet-switching communications network, and wherein the first signaling information is transmitted using a data area of the signaling packets which does not contain any second signaling information.

6. The method as claimed in claim 1, wherein at least one service or feature which cannot be used by the second signaling information is made available for use to the first subscriber via the first signaling information.

7. The method as claimed in claim 6, wherein the service or feature is at least one of call pick-up, call divert, call forwarding, call name display, subscriber cut-in, subscriber-dependent ringing, three-way conferencing, large-scale conferencing, holding, displaying of toll information, a closed user group, a private call number schedule, call number identification, automatic callback when busy, automatic callback when no reply, call barring, call waiting and call transfer.

8. The method as claimed in claim 1, wherein the first signaling information is transmitted between the first subscriber and at least one second subscriber in accordance with a tunnel principle using the packet-switching communications network.

9. The method as claimed in claim 1, wherein the interface unit converts the first signaling information of the network element into second signaling information, and further converts the second signaling information into the first signaling information, the first signaling information is signaling information of the circuits switching communications network which can be converted to the second signaling information.

10. The method as claimed in claim 1, wherein user data is transmitted using the network element when there is a connection between the first subscriber and at least one second subscriber.

11. The method as claimed in claim 10, wherein the user data is transmitted directly between the first and second subscribers using the packet-switching communications network when there is a connection between the first subscriber and the at least one second subscriber of the packet-switching communications network.

12. The method as claimed in claim 1, wherein the first subscriber assumes one of a main line function and an extension function.

13. The method as claimed in claim 1, wherein a call number is assigned to the first subscriber in the network element, the first subscriber in the packet-switching communications network has a subscriber address, and wherein the assignment between the subscriber address and the call number is made using a control unit.

14. The method as claimed in claim 1, wherein the first subscriber is administered as a subscriber with one of an ISDN basic access and a broadband ISDN access in the network element.

15. The method as claimed in claim 14, wherein the ISDN access is one of an ISDN access in point-to-point configuration and an ISDN access in point-to-multipoint configuration.

16. The method as claimed in claim 1, wherein the packet-switching communications network is a data network which is based on an Internet protocol, and the first subscriber is an IP terminal.

17. The method as claimed in claim 1, wherein the first subscriber sets up a voice connection to a second subscriber.

18. A telecommunications system for operating a telecommunications system having a packet-switching communications network, comprising:

means for establishing a connection between at least one first subscriber to the packet-switching communications network;

means for establishing a connection between a network element of a circuit-switching communications network to the packet-switching communications network using an interface unit;

means for transmitting first signaling information, intended for the at least one first subscriber, from the network element to the interface unit;

means for processing the first signaling information in the interface unit wherein at least one part of the first signaling information is configured according to a signaling standard of the circuit-switching communication network and the remaining part is converted to second signaling information according to the signaling standard of the packet-switched communications network; and means for transmitting the processed signaling information from the interface unit to the first subscriber, wherein the second signaling information is transmitted using signaling packets of the packet-switching communications network, and the at least one part of the first signaling information is transmitted using a data area of the signaling packets that do not contain any second signaling information.

* * * * *